Inventor:
HEINZ FLEISSNER

BY: Craig & Antonelli
ATTORNEYS

United States Patent Office 3,510,959
Patented May 12, 1970

3,510,959
APPARATUS CONTAINING A MESH JACKET AND MEANS FOR MOUNTING THE MESH JACKET
Heinz Fleissner, Egelsbach, near Frankfurt am Main, Germany, assignor to VEPA AG.
Filed Jan. 23, 1968, Ser. No. 699,931
Claims priority, application Germany, Jan. 25, 1967, V 32,847
Int. Cl. F26b 13/30
U.S. Cl. 34—115        13 Claims

ABSTRACT OF THE DISCLOSURE

The present disclosure relates to a sieve drum means containing a mesh jacket which substantially covers the working surface of said sieve drum, said mesh jacket being closed at its joint-abutting surfaces by a spiral or zig-zag point which extends along the surface of said jacket. The mesh jacket is attached to a tensioning ring which is resiliently mounted to the bottom of the sieve drum means.

BACKGROUND OF THE INVENTION

The present invention relates to a drum with a mesh cover, for example a metal wire mesh cover and to a means for mounting the mesh cover as a jacket covering for a drum, for example a sieve drum.

Devices with sieve drums subject to a suction draft are well known. Also, it is well known to provide these sieve drums with a metal wire mesh cover in order to prevent marking of the perforation on the material being treated and to avoid the fibers from being drawn into the interior of the drum. With sieve drum dryers the wire meshes are generally soldered to the sieve drum jackets. At the joint abutments of the wire mesh a soldered joint which is about 7 to 10 mm. wide is formed which is not permeable to air.

When drying loose fibrous stock as well as woven and kitted fabrics, the use of a soldered joint is not significant. However, the danger of the joint marking the material being processed is encountered when drying delicate materials, for example viscose lining fabrics, and also in various treatment processes, for example in fiber and dyestuff setting. In these situations it is an absolute necessity that the joint of the wire mesh is also permeable to air and that the wire mesh does not overlap.

It has been attempted to cover the drums with a metal wire mesh by having the joint abutments overlap and by connecting the ends of the wire mesh by spot-welding. In this case, the air-permeability was ensured. However, a raised joint was formed which leaves a mark on the material, for example in fiber setting of woven and knitted fabrics. Marking of the joint abutment and/or the joint of the wire mesh must be avoided because the marking becomes set and cannot later be removed.

SUMMARY OF THE INVENTION

An object of the present invention is to avoid the prior art disadvantages in the use of a mesh cover as a jacket for a sieve drum means.

Another object of the present invention is to provide an improved means for mounting a metal wire mesh jacket on the surface of a sieve drum means.

A further object of the present invention is to provide a means for resiliently mounting a wire mesh jacket to the surface of a sieve drum means.

Another object of the present invention is to provide a means for mounting a metal wire mesh cover to a sieve drum means, said wire mesh cover being permeable to the treatment medium, for example air, even at the joint abutments of the mesh cover thereby leaving no markings on the material being treated.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated in a much improved mesh cover and means for mounting the mesh cover to a drum, that is, as a jacket covering a drum, can be obtained by connecting the mesh cover, for example a metal wire mesh cover, at its joint abutments, without having them overlap, by means of a spiral joint or a zig-zag joint, so that a continuous tube is formed. Thus the joint is made with a metal wire.

According to a further embodiment of the present invention, a safe seating of the wire mesh on the sieve drum is obtained by cutting a wire mesh with a diagonal thread structure according to the thread structure and by sewing the joints together spirally or in a zig-zag manner so that a tube is formed. The tube is then pulled over the drum, tensioned, and fastened in a tensioned condition at each end to a tensioning ring which is mounted to the sieve drum, especially to the adjoining drum face.

In heat-setting and Thermosol process and also in curing and polymerizing processes, temperatures of up to 250° C. are employed. The thermal expansion is considerable at these temperatures as compared with normal room temperature of about 20° C. Since at the last drum of a sieve drum dryer fresh air is generally drawn in, the wire mesh is constantly exposed to temperature differences of up to about 200° C. or more. Wire meshes which are rigidly mounted to the sieve drums by soldering or welding do not resist these enormous temperature differences for a long time without breaking. In order to permit expansion and contraction of the wire mesh as the temperature fluctuates on the sieve drum, it is, according to another feature of the present invention, suggested to support the tensioning rings to which the metal wire meshes are fastened, resiliently to the drum faces.

For a proper fastening of the wire mesh to the tensioning rings and for a proper fastening of the tensioning rings to the drums, it is advantageous if the tensioning rings are angle-shaped and if the tensioning rings have the same diameter as the sieve drums. An effective means for fastening the tensioning rings to the drums is to adjustably support the tensioning ring on bolts and to support it resiliently to the drum bottom by means of helical pressure springs. It is desirable to fasten the metal wire mesh to the tensioning ring by riveting and soldering and/or by riveting and welding. In order to avoid the danger of the tensioning ring becoming loose because of an inadequate fastening of the wire mesh cover, and to prevent the drum from becoming damaged by the loose tensioning ring, it is furthermore suggested to secure the bolts on which the tensioning rings are adjustably supported with set pins which are arranged vertically to the bolt axis. In this way, it is, on the one hand, ensured that the tensioning ring cannot become detached from the bolts and, on the other hand, that the metal wire mesh cannot completely be torn from the tensioning ring in the case of improper fastening.

Futhermore, it is suggested according to the present invention to use for the joint either the same wire as is used for the wire mesh or to use a wire which has approximately the same thickness as the wire used in the wire mesh. In this way marking of the joint is safely avoided.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
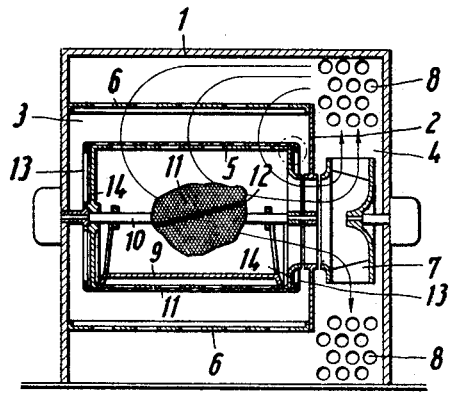
FIG. 1 is a cross-sectional view of a sieve drum dryer.

Referring now to the drawings wherein like reference numerals are used throughout the various views to designate like parts, the apparatus of the present invention comprises a heat-insulated housing 1 which is subdivided by a partition means 2 into a treatment chamber 3 and into a fan chamber 4. In the treatment chamber 3 one or several sieve drums 5 subjected to a suction draft are arranged as well as sieve sheets 6 disposed above and beneath the sieve drums. In the fan chamber 4 a fan wheel 7 is correlated to the face of each sieve drum. The fan wheel draws the air out of the sieve drum 5 and recirculates it upwards and downwards through heater batteries 8 into the treatment chamber 3 where the air is drawn back into the sieve drums through the material (not shown) resting on the sieve drums. The suction draft is interrupted at that portion of the sieve drum which is not covered with the material being treated by means of a baffle 9 which is mounted to a stationary sieve drum axis 10.

Furthermore, in FIG. 1 a section of a wire mesh 11 which is mounted to the sieve drums 5 is shown. The two ends of the wire mesh are connected by an oblique or diagonal joint 12.

Figure 2:
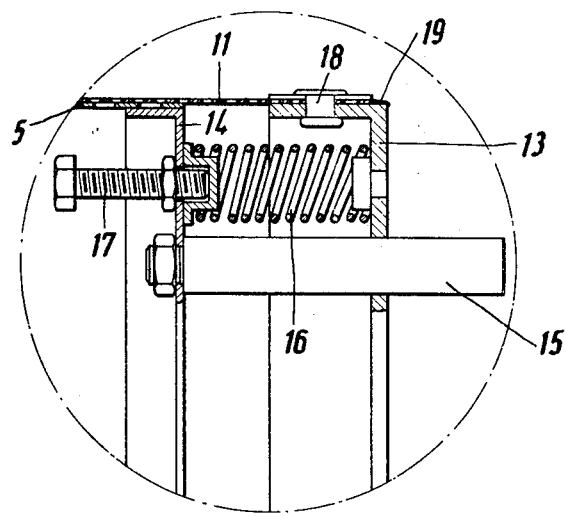
FIG. 2 is an enlarged section of the means for fastening the wire mesh cover on the sieve drum.

The mounting of the wire mesh to the sieve drum is shown in FIG. 2. At the two sides of the sieve drum tensioning rings 13 are arranged which are fastened resiliently to the sieve drum 5. For this purpose bolts 15 are screwed to sieve drum bottoms 14, on which bolts the tensioning rings 13 are adjustably supported. For the resilient fastening of the tensioning rings 13 to the sieve drum bottoms 14, helical pressure springs 16 are used. By means of an adjusting screw 17 which is correlated to each helical pressure spring 16 it is possible to adjust and readjust the tension. The wire mesh 11 is mounted to the tensioning rings 13 by means of rivets 18 and a welded or soldered joint 19.

Figure 3:
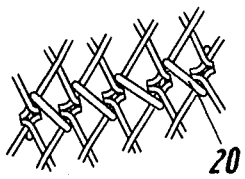
FIG. 3 is a detailed view of a typical wire mesh joint according to the present invention.

FIG. 3 shows a detail of one possible way of forming a wire mesh joint. The two joint abutments of the wire mesh 11 are sewed together spirally by means of a wire 20.

The invention being thus described, it will be obvious that the same may be varied in many ways. Such variations are not to be regarded as a departure from the spirit and scope of the invention, and all such modifications are intended to be included within the scope of the following claims.

It is claimed:

1. A sieve drum means containing a mesh jacket which substantially covers the working surface of said drum, said mesh jacket having a diagonal thread structure and a diagonal joint cut according to said thread structure, and a spiral or zig-zag joint which extends diagonally along the surface of said jacket for closing said diagonal joint cut at its joint-abutting surface.

2. The sieve drum means of claim 1, wherein the diagonal joint of the mesh jacket is provided with a spiral joint, said diagonal joint being sewed together at its joint-abutting surfaces without overlapping.

3. The sieve drum means of claim 1, further comprising a tensioning ring attached to the mesh jacket and a means for resiliently mounting said tensioning ring to the bottom of the sieve drum means.

4. The sieve drum means of claim 3, wherein the tensioning ring is angle-shaped and has the same outer diameter as the sieve drum means.

5. The sieve drum means of claim 4 wherein bolt means are fastened to the sieve drum bottom, said tensioning ring being adjustably mounted in said bolt means and helical pressure spring means are disposed between said tensioning ring and the sieve drum bottom, said tensioning ring being resiliently mounted to the drum bottom by means of said helical pressure spring means.

6. The sieve drum means of claim 3, wherein rivet means are provided for fastening the mesh jacket to the tensioning ring, together with a welded or soldered joint.

7. The sieve drum means of claim 5, further comprising screw means for adjusting the tension in the mesh jacket, said screw means being operatively associated with the helical pressure spring means.

8. The sieve drum means of claim 5, wherein pin means are arranged in the bolt transversely to the bolt axis, the tension ring which is adjustably mounted on said bolts being secured by said pin means.

9. The sieve drum means of claim 1, wherein the joint-abutting surfaces do not overlap.

10. A sieve drum means containing a wire mesh jacket which substantially covers the working surface of said sieve drum, a spiral or zig-zag joint provided for closing said wire mesh jacket at its joint-abutting surfaces, without overlapping, said spiral or zig-zag joint extending along the surface of said wire mesh jacket, and a tensioning ring resiliently mounted to the bottom of the sieve drum means, said wire mesh jacket being attached to said tensioning ring.

11. The sieve drum means of claim 10, wherein the joint is formed by a metal wire.

12. The sieve drum means of claim 11, wherein the wire used for sewing the joint has about the same thickness as the wires of the wire mesh.

13. The sieve drum means of claim 10, wherein the joint abutting surfaces extend diagonally along the surface of the wire mesh jacket.

References Cited

UNITED STATES PATENTS

| | | | |
|---|---|---|---|
| 177,196 | 5/1876 | Braunhold | 34—115 XR |
| 340,335 | 4/1886 | Lindsay | 34—243 XR |
| 347,360 | 8/1886 | Lorimer | 34—115 |
| 1,895,345 | 1/1933 | Pink | 34—39 XR |
| 2,885,164 | 5/1959 | Hooper | 34—39 XR |

KENNETH W. SPRAGUE, Primary Examiner